(12) United States Patent
Park et al.

(10) Patent No.: US 8,289,606 B2
(45) Date of Patent: Oct. 16, 2012

(54) OPTICAL IMAGE SHUTTER AND METHOD OF MANUFACTURING THE SAME

(75) Inventors: Yong-hwa Park, Yongin-si (KR); Chul-ho Jung, Busan (KR); Dae-ho Yoon, Suwon-si (KR)

(73) Assignees: Samsung Electronics Co., Ltd., Suwon-si (KR); Sungkyunkwan University Foundation for Corporate Collaboration, Suwon-si (KR)

( * ) Notice: Subject to any disclaimer, the term of this patent is extended or adjusted under 35 U.S.C. 154(b) by 257 days.

(21) Appl. No.: 12/846,188

(22) Filed: Jul. 29, 2010

(65) Prior Publication Data

US 2011/0170160 A1 Jul. 14, 2011

(30) Foreign Application Priority Data

Jan. 8, 2010 (KR) ........................ 10-2010-0001908

(51) Int. Cl.
*G02F 1/03* (2006.01)
*G02F 1/00* (2006.01)

(52) U.S. Cl. ......... 359/245; 359/321; 359/322; 359/900

(58) Field of Classification Search ............ 359/245, 359/321, 322, 900; 427/108, 596; 156/246
See application file for complete search history.

(56) References Cited

U.S. PATENT DOCUMENTS

| 4,755,415 A | 7/1988 | Iijima et al. |
| 4,854,678 A | 8/1989 | Kitano et al. |
| 4,887,104 A | 12/1989 | Kitano et al. |
| 6,327,073 B1 | 12/2001 | Yahav et al. |
| 2002/0018277 A1 | 2/2002 | Carlson et al. |
| 2009/0161059 A1 | 6/2009 | Emig et al. |

FOREIGN PATENT DOCUMENTS

| KR | 1020090004198 A | 1/2009 |
| KR | 1020090056541 A | 6/2009 |

OTHER PUBLICATIONS

Pochi Yeh, Introduction to Photorefractive Nonlinear Optics, John Wiley & Sons, 1993, pp. 25-29.
H.J.Coufal, D.Psalits, and G.T. Sincerbox, Holographic Data Storage, Springer Series in Optical Science, Springer, 2000, pp. 118-121.
K. Fujiura and K. Nakamura, "KTN Optical Waveguide Technologies with a Large Electro-Optic Effect," Pacific Rim Conference on Lasers and Electro-Optics, 2005. CLEO/Pacific Rim 2005, pp. 69-70.
H.K.Pulker, Coating on Glass, Thin Film Science and Technology, V6, Elseier, 1996, pp. 395-397.
G.R. Fowles, Introduction to Modern Optics, Dover Publication, 1989, pp. 96-103.

*Primary Examiner* — Jack Dinh
(74) *Attorney, Agent, or Firm* — Sughrue Mion, PLLC

(57) ABSTRACT

An optical image shutter having a transparent electro-optical crystal formed on a transparent amorphous substrate and a method of manufacturing the optical image shutter. The light image shutter is created by forming a buffer layer using a material having a similar crystalline structure to an electro-optical crystal, on a transparent amorphous substrate such as glass, and forming an electro-optical thin film layer such as the electro-optical crystal on the buffer layer.

27 Claims, 13 Drawing Sheets

OPTICAL IMAGE SHUTTER AND METHOD OF MANUFACTURING THE SAME

CROSS-REFERENCE TO RELATED APPLICATIONS

This application claims priority from Korean Patent Application No. 10-2010-0001908, filed on Jan. 8, 2010, in the Korean Intellectual Property Office, the contents of which are hereby incorporated by reference in their entirety.

BACKGROUND

1. Field

Apparatuses and methods consistent with exemplary embodiments relate to optical image shutters and methods of manufacturing optical image shutters, and more particularly, to optical image shutters having transparent electro-optical crystal formed on transparent amorphous substrates.

2. Description of the Related Art

Optical image shutters transmit or block an optical image containing information according to a control signal. Optical shutters are essential optical modules widely used in image pickup devices, such as cameras, and display devices, such as liquid crystal displays (LCDs).

Optical shutters may be technically classified into a mechanical shutter used in a camera or the like, a liquid crystal shutter used in an LCD, a digital micromirror device used in a projection display device, a micro-electro-mechanical system (MEMS)-based spatial light modulator such as a grating light-valve, an image intensifier used in a laser radar (LADAR) or a three-dimensional (3D) camera, and a semiconductor-based optical shutter.

In terms of working principles and shutter speeds, a mechanical shutter drives an aperture by using an electromagnetic motor and has a shutter time on the order of 1 millisecond (ms). A liquid crystal shutter is driven by the rotation of liquid crystal molecules and has a shutter time of several milliseconds. A MEMS-based spatial light modulator drives a fine structure with an electrostatic force and has an operation time of tens of microseconds (µs). An intensifier used in a 3D camera and a semiconductor-based optical shutter are driven by photoelectric conversion occurring in a semiconductor and have a shutter time of several nanoseconds (ns).

Much research into obtaining distance information of a subject by using a LADAR or a 3D camera has been recently conducted. To obtain the distance information, light having a specific wavelength (for example, a near infrared ray having a wavelength of 860 nm) is projected onto the subject by using an LED or a laser diode (LD), a light image reflected from the subject is (shuttered), an image is obtained via an imaging device, and a series of processing is performed on the image. In this regard, a fast shutter opening and closing time of about tens of ns is used to exactly identify a light traveling time to determine a distance. An image shutter, such as the image intensifier or the semiconductor-based optical shutter stated above, provides a fast shutter opening and closing time.

The image intensifier is an expensive piece of equipment requiring a high operating voltage and vacuum packaging. The semiconductor-based optical shutter includes a light absorber using a multi-quantum well structure based on a III-V group semiconductor, such as GaAs, a combination of an opto-electric converter (for example, a photodiode), and an electro-optical converter (for example, an LED), etc. The semiconductor-based optical shutter is manufactured using a GaAs substrate during a semiconductor manufacturing process.

In addition to the light shutters described above, another kind of light shutter relies on an electro-optical effect in which a refractive index varies according to an electric field applied thereon. Since the light shutter relying on the electro-optical effect described above has a response speed corresponding to several tens of GHz, it may be used as a waveguide in ultra-speed optical communication. Examples of the light shutter relying on the electro-optical effect described above include a Kerr cell using the Kerr effect and a Pockel cell using the Pockel effect. Kerr cells and Pockel cells relying on the electro-optical effect described above often use a bulk electro-optical crystal that requires a driving voltage of thousands of volts in order to obtain a desired effect. It has recently been proposed that a light shutter that operates at a low voltage can be created by forming a thin film using an electric-optic material. In this regard, a technology for crystallizing the electro-optical material as a thin film on an amorphous substrate such as glass is at issue.

SUMMARY

One or more exemplary embodiments include an optical image shutter having a transparent electro-optical crystal formed on a transparent amorphous substrate.

One or more exemplary embodiments include a method of manufacturing an optical image shutter by forming a transparent electro-optical crystal on a transparent amorphous substrate.

Additional exemplary embodiments will be set forth in part in the description which follows, and will be apparent, in part, from the description, or may be learned by practice of the presented exemplary embodiments.

According to one or more exemplary embodiments, a light image shutter including: a transparent amorphous substrate; a first reflective layer disposed on the transparent amorphous substrate; a crystalline transparent buffer layer disposed on the first reflective layer; a crystalline electro-optical thin film layer disposed on the crystalline transparent buffer layer and having a refractive index which varies with respect to an electric field; a transparent electrode disposed on the crystalline electro-optical thin film layer; and a second reflective layer disposed on the transparent electrode.

In exemplary embodiments, the transparent amorphous substrate may be formed of glass.

In another exemplary embodiment, a difference between a lattice constant of the crystalline transparent buffer layer and a lattice constant of the crystalline electro-optical thin film layer may be less than 20%.

The crystalline transparent buffer layer of exemplary embodiments may include a first buffer layer having conductivity and a second buffer layer having a crystalline structure that is the same as that of the crystalline electro-optical thin film layer.

The first buffer layer of exemplary embodiments may be formed of a transparent conductive oxide material.

In exemplary embodiments, the transparent conductive oxide material may include ITO, AZO, IZO, $SnO_2$, $In_2O_3$, or a ZnO based material, and the second buffer layer is formed of $SrTiO_3$.

The crystalline transparent buffer layer of exemplary embodiments may be formed of a ZnO based material.

In another exemplary embodiment, the transparent buffer layer may be formed by doping ZnO with Al or Ga by 1 mol % and 5 mol %.

In exemplary embodiments, the ZnO based material may include Al—In—Zn—O, In—Ga—Zn—O, Sn—Ga—Zn—O, or Sn—Al—Zn—O.

The crystalline transparent buffer layer of exemplary embodiments may have a multi-layer structure of ZnO/Ag/ZnO.

In exemplary embodiments, the materials forming the crystalline transparent buffer layer and the transparent electrode may be the same.

The crystalline electro-optical thin film layer of exemplary embodiments may include at least one selected from the group consisting of $KTa_{1-x}Nb_xO_3$ ($0 \leq x \leq 1$) (KTN), $LiNbO_3$ (LN), Pb ($ZrO_{1-x}Ti_x$) $O_3$ ($0 \leq x \leq 1$) (PZT), and 4-dimethylamino-N-methyl-4 stilbazolium (DAST).

According to one or more exemplary embodiments, a light image shutter includes: a transparent substrate; a first reflective layer disposed on the transparent substrate; a transparent electrode disposed on the first reflective layer; a crystalline electro-optical thin film layer disposed on the transparent electrode and having a refractive index which varies with respect to an electric field; a crystalline transparent buffer layer disposed on the crystalline electro-optical thin film layer; and a second reflective layer disposed on the crystalline transparent buffer layer.

According to one or more exemplary embodiments, an optical device uses a light image shutter as a shutter.

According to one or more exemplary embodiments, a method of manufacturing a light image shutter includes: forming a first reflective layer on a transparent amorphous substrate; forming a crystalline transparent buffer layer on the first reflective layer; depositing a crystalline electro-optical thin film layer having a refractive index which varies with respect to an electric field on the crystalline transparent buffer layer; and forming a transparent electrode on the crystalline electro-optical thin film layer; and forming a second reflective layer on the transparent electrode.

In exemplary embodiments, the crystalline electro-optical thin film layer may be formed at a temperature below 300° C. using by a pulsed laser deposition (PLD).

According to one or more exemplary embodiments, a method of manufacturing a light image shutter includes: forming a sacrificial layer on a crystalline substrate; forming a first reflective layer on the sacrificial layer; forming a crystalline transparent buffer layer on the first reflective layer; depositing a crystalline electro-optical thin film layer having a refractive index which varies with respect to an electric field on the crystalline transparent buffer layer; and forming a transparent electrode on the crystalline electro-optical thin film layer; forming a second reflective layer on the transparent electrode; bonding the second reflective layer on a transparent substrate by using a flip-chip bonding method; and removing the sacrificial layer and removing the crystalline substrate from the first reflective layer.

BRIEF DESCRIPTION OF THE DRAWINGS

These and/or other aspects of exemplary embodiments will become apparent and more readily appreciated from the following description of the exemplary embodiments, taken in conjunction with the accompanying drawings of which.

DETAILED DESCRIPTION

Figure 1:
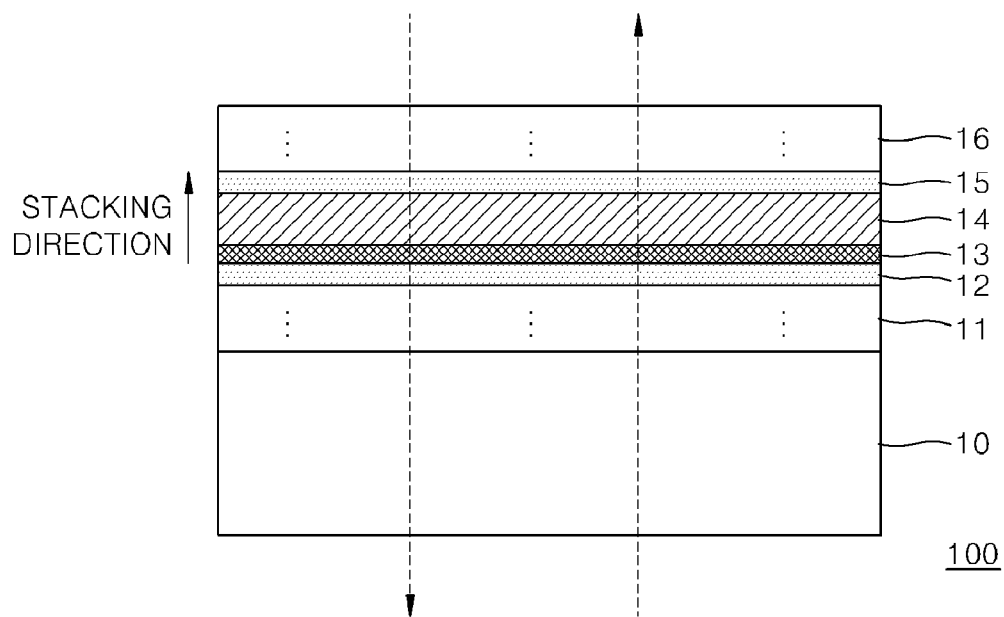
FIG. 1 is a cross-sectional view of a transmission type optical image shutter according to an exemplary embodiment of the present invention.

Reference will now be made in detail to exemplary embodiments, examples of which are illustrated in the accompanying drawings, wherein like reference numerals refer to the like elements throughout. The thicknesses of layers or regions illustrated in the drawings are exaggerated for clarity. In this regard, the present exemplary embodiments may have different forms and should not be construed as being limited to the descriptions set forth herein. Accordingly, the exemplary embodiments are merely described below, by referring to the figures, to explain aspects of the exemplary embodiments.

FIG. 1 is a cross-sectional view of a transmission type optical image shutter 100 according to an exemplary embodiment. Referring to FIG. 1, the light transmission type optical image shutter 100 may include a transparent substrate 10, a first reflective layer 11 disposed on the transparent substrate 10, a first transparent electrode 12 disposed on the first reflective layer 11, a transparent buffer layer 13 disposed on the first transparent electrode 12, a transparent electro-optical thin film layer 14 disposed on the transparent buffer layer 13, a second transparent electrode 15 disposed on the electro-optical thin film layer 14, and a second reflective layer 16 disposed on the second transparent electrode 15.

The transparent substrate 10 may be formed of a transparent amorphous material, such as glass. The first transparent electrode 12 and the second transparent electrode 15 are used to apply an electric field to the electro-optical thin film layer 14. Transparent metal oxide materials, for example, ITO (Indium Tin Oxide), AZO (Aluminum Zinc Oxide), IZO (Indium Zinc Oxide), $SnO_2$ (Tin oxide), or $In_2O_3$, may be used to form the first transparent electrode 12 and the second transparent electrode 15.

The first reflective layer 11 and the second reflective layer 16 may each be formed with a high reflectivity for light of a specific wavelength band by alternately stacking two types of transparent dielectric thin films having different refractive indices. Layers having transmission and reflection characteristics, such as thin metal layers, may be used to form the first reflective layer 11 and the second reflective layer 16, instead of the dielectric thin films. For example, the first reflective layer 11 and the second reflective layer 16 may have a reflectivity of about 97%. In this case, incident light resonates between the first reflective layer 11 and the second reflective layer 16 having the electro-optical thin film layer 14 interposed therebetween. Thus, light of a narrow wavelength band corresponding to a resonance mode may be transmitted to the electro-optical thin film layer 14. Such a structure including the first reflective layer 11, the electro-optical thin film layer 14, and the second reflective layer 16 functions as a Fabry-Perot filter having the controllable single wavelength transmission characteristics described above. A wavelength band of the transmitted light may be controlled according to a refractive index and thickness of the electro-optical thin film layer 14. The light that passes through the light image shutter 100 may be captured by an image device (not shown) that uses, for example, a charged coupled device (CCD) or a complementary metal oxide semiconductor (CMOS) image sensor.

The electro-optical thin film layer 14 may be formed of a material having an electro-optical effect in which the refractive index of the electro-optical thin film layer 14 varies according to an intensity of an applied electric field. The electro-optical thin film layer 14 may be formed of crystals, such as $KTa_{1-x}Nb_xO_3$ ($0 \leq x \leq 1$) (KTN), $LiNbO_3$ (LN), Pb $(ZrO_{1-x}Ti_x) O_3$ ($0 \leq x \leq 1$) (PZT), DAST (4-dimethylamino-N-methyl-4 stilbazolium), etc. It is important to control crystallinity and directivity of the electro-optical thin film layer 14 in order to improve the electro-optical effect of the electro-optical thin film layer 14. For example, KTN is formed having a Perovskite-type structure having a lattice constant a of 3.9 Å in order to increase the electro-optical effect of KTN.

However, two problems may occur when a crystallized electro-optical thin film layer 14 is formed using a conventional method. First, crystal thin film growth of the electro-optical thin film layer 14, such as crystal thin film growth of KTN, is possible only on a crystallized substrate. Thus, it is difficult to use an amorphous substrate, such as glass, which is a low cost, easily mass produced substrate. Second, although crystallized substrates, such as Si, GaAs, $Al_2O_3$, MgO, $SrTiO_3$, etc., may be used, a high temperature process above 700° C. is necessary in order to form the electro-optical thin film layer 14. However, such a high temperature process may cause changes to the characteristics of the layers, such as a change in the refractive indices of the first reflective layer 11 and the second reflective layer 16. For example, KTN is not easily crystallized if a difference between the lattice constants of a substrate and of KTN is greater than 10%. Further, even when the difference of the lattice constants between the substrate and KTN is less than 10%, if a KTN thin film is deposited at a low temperature, amorphous characteristics and phase change characteristics are generated.

In order to solve the problems described above, in exemplary embodiments the transparent buffer layer 13 is formed of a material that is easily crystallized at a temperature lower than 300° C. irrespective of the lattice constant of the layer on which the material is formed, such a as transparent conductive oxide (TCO), before forming the electro-optical thin film layer 14. The transparent buffer layer 13 is formed between the first transparent electrode 12 and the electro-optical thin film layer 14. The transparent buffer layer 13 may be adjusted to have a lattice constant similar to the lattice constant of the electro-optical thin film layer 14 in order to facilitate crystallization of the electro-optical thin film layer 14. For example, the lattice constant of the transparent buffer layer 13 may be adjusted in such a way that a difference of the lattice constant between the transparent buffer layer 13 and the electro-optical thin film layer 14 is less than 20% or 10%.

The transparent buffer layer 13 may be formed of a material having excellent electric conductivity so as to function as an electrode, be easily crystallized at a low temperature, and have a lattice constant similar to the lattice constant of the electro-optical thin film layer 14. For example, the transparent metal oxide materials used for the first transparent electrode 12 and the second transparent electrode 15 may function as the transparent buffer layer 13 to some degree. However, such materials have relatively greater lattice constants than that of the electro-optical thin film layer 14, and thus $SrTiO_3$ may be used as the transparent buffer layer 13 on the first transparent electrode 12. $SrTiO_3$ has the same Perovskite structure as KTN, and has a lattice constant similar to the lattice constant of KTN. In this case, a two layer structure in which the first transparent electrode 12 functions as a first buffer layer and $SrTiO_3$ functions as a second buffer layer is disposed below a lower portion of the electro-optical thin film layer 14.

Meanwhile, a ZnO based transparent oxide semiconductor material has a lattice constant quite similar to the lattice constant of KTN, that is, 3.3 Å. ZnO is also easily crystallized at a temperature lower than 300° C. irrespective of crystallinity of a substrate on which the ZnO is formed. The lattice constant of ZnO is easily adjusted by doping, and in addition, doping also easily improves electric conductivity of ZnO. For example, ZnO may be doped with Al or Ga in order to adjust its lattice constant and improve its electric conductivity. In this regard, Al may be doped with the Al doping density greater than or equal to 1 mol %, or Ga may be doped with the Ga doping density less than or equal to 5 mol %. Thus, the ZnO based material may simultaneously function as a transparent electrode and as a transparent buffer layer.

Figure 2:
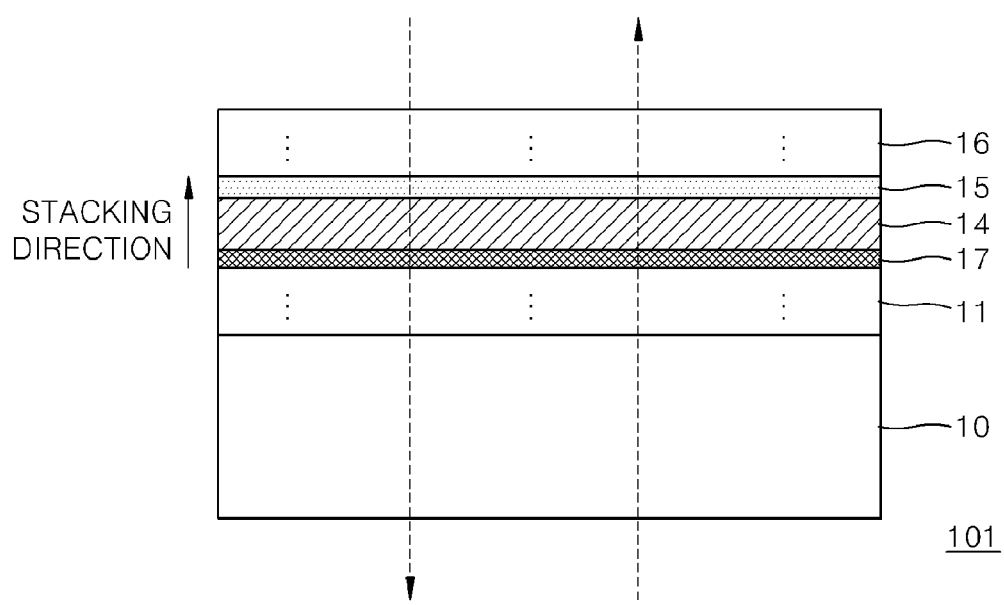
FIG. 2 is a cross-sectional view of a transmission type optical image shutter according to another exemplary embodiment of the present invention.

FIG. 2 is a cross-sectional view of a transmission type optical image shutter 101 according to another exemplary embodiment, in which a transparent conductive buffer layer 17 is formed of a ZnO based material. Referring to FIG. 2, the light image shutter 101 may include the transparent substrate 10 formed of an amorphous material, such as glass, the first reflective layer 11 disposed on the transparent substrate 10, the transparent conductive buffer layer 17 disposed on the first reflective layer 11, the transparent electro-optical thin film layer 14 disposed on the transparent conductive buffer layer 17, the second transparent electrode 15 disposed on the transparent electro-optical thin film layer 14, and the second reflective layer 16 disposed on the second transparent electrode 15.

In this regard, the transparent conductive buffer layer 17 formed of a ZnO based material simultaneously functions as the first transparent electrode 12 and as the transparent buffer layer 13 shown in FIG. 1. Further, a 3-component based material or a 4-component based material having 3 to 4 different compositions, such as Al—In—Zn—O, In—Ga—Zn—O, Sn—Ga—Zn—O, Sn—Al—Zn—O, etc., may be used to form the transparent conductive buffer layer 17. In this case, it is possible to adjust the lattice constant and electric conductivity of the transparent conductive buffer layer 17 to a desired value by changing the compositions including Al, In, G and Sn. If the transparent conductive buffer layer 17 has a ZnO/Ag/ZnO structure in which Ag, which has excellent electric conductivity, is disposed as a thin film between ZnO based materials, the electric conductivity of the transparent conductive buffer layer 17 having the ZnO/Ag/ZnO structure may be further improved compared to the transparent conductive buffer layer 17 having a single ZnO structure. In this manner, if the transparent conductive buffer layer 17 is formed, a manufacturing process in which the transparent electro-optical thin film layer 14 is formed may be performed at a relatively low temperature (for example, below about 300° C.), and the crystallinity of the transparent electro-optical thin film layer 14 may be also improved. Further, if $SrTiO_3$ having the same crystalline structure as the transparent electro-optical thin film layer 14 and a lattice constant similar to that of the transparent electro-optical thin film layer 14 is used as a secondary buffer layer on the transparent conductive buffer layer 17, the crystallinity of the transparent electro-optical thin film layer 14 may be further improved. That is, in a manner similar to FIG. 1, the ZnO based material may be used as a primary buffer layer, and $SrTiO_3$ may be used as a secondary buffer layer.

Figure 3:
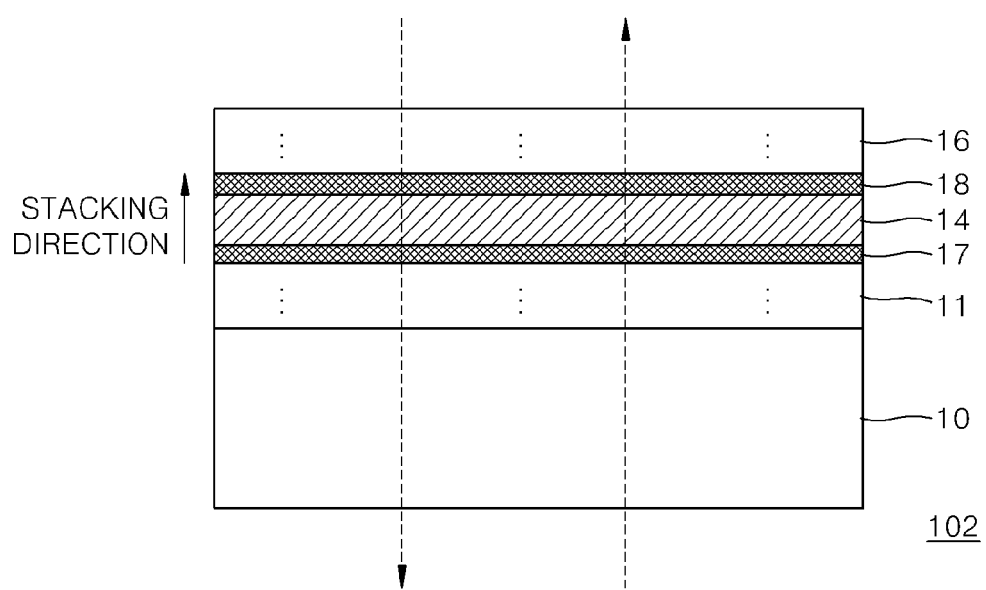
FIG. 3 is a cross-sectional view of a transmission type optical image shutter according to another exemplary embodiment of the present invention.

In the light image shutter 101 of an exemplary embodiment, the transparent conductive buffer layer 17 is formed only below a lower portion of the transparent electro-optical thin film layer 14, and the transparent electrode 15 is formed on an upper portion thereof. However, it may be possible to form the transparent conductive buffer layer 17 having the structure described above on both the lower and upper portions of the transparent electro-optical thin film layer 14. FIG. 3 is a cross-sectional view of an exemplary embodiment of a transmission type optical image shutter 102 having the above-described structure. The light image shutter 102 shown in FIG. 3 is similar to the light image shutter 101 shown in FIG. 2, except that a second transparent conductive thin film layer 18, and not a transparent electrode, is formed on the upper portion of the transparent electro-optical thin film layer 14. The second transparent conductive thin film layer 18 formed on the upper portion of the transparent electro-optical thin film layer 14 has the same structure and is formed of the same material as the first transparent conductivity buffer layer 17 formed below the lower portion of the transparent electro-optical thin film layer 14. Therefore, the total number of types of materials for manufacturing the light image shutter 102 is reduced, thereby significantly simplifying the manufacturing process.

Figure 4:
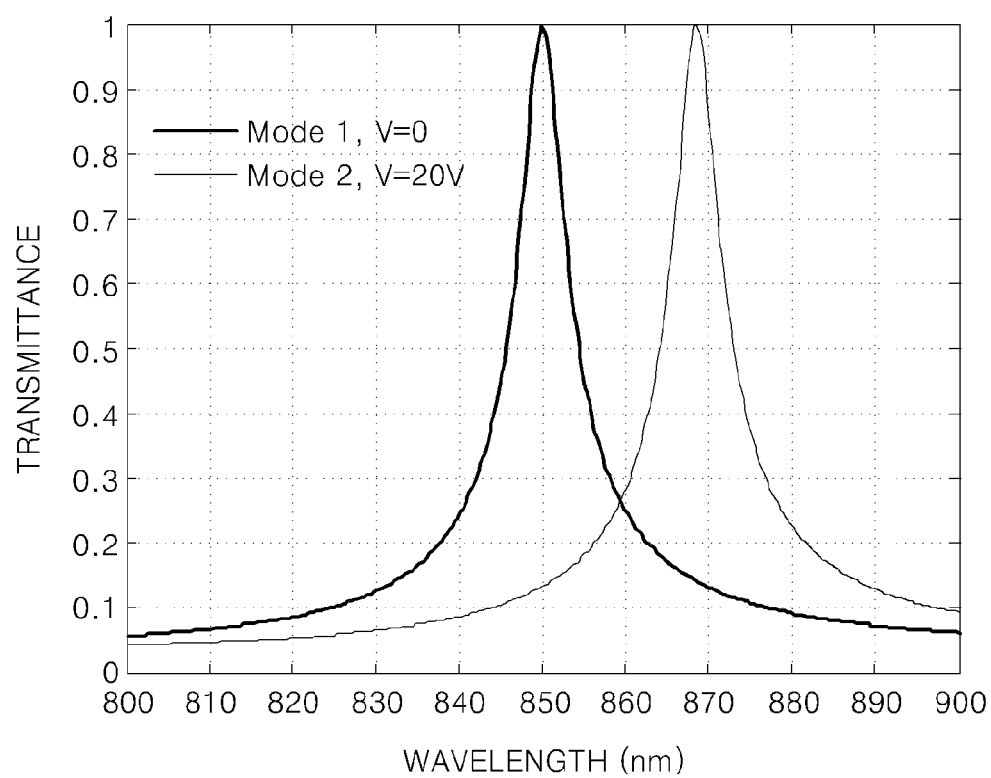
FIGS. 4 through 6 are graphs for explaining general operations of the transmission type light image shutters of FIGS. 1 through 3 according to exemplary embodiments of the present invention.
Figure 5:
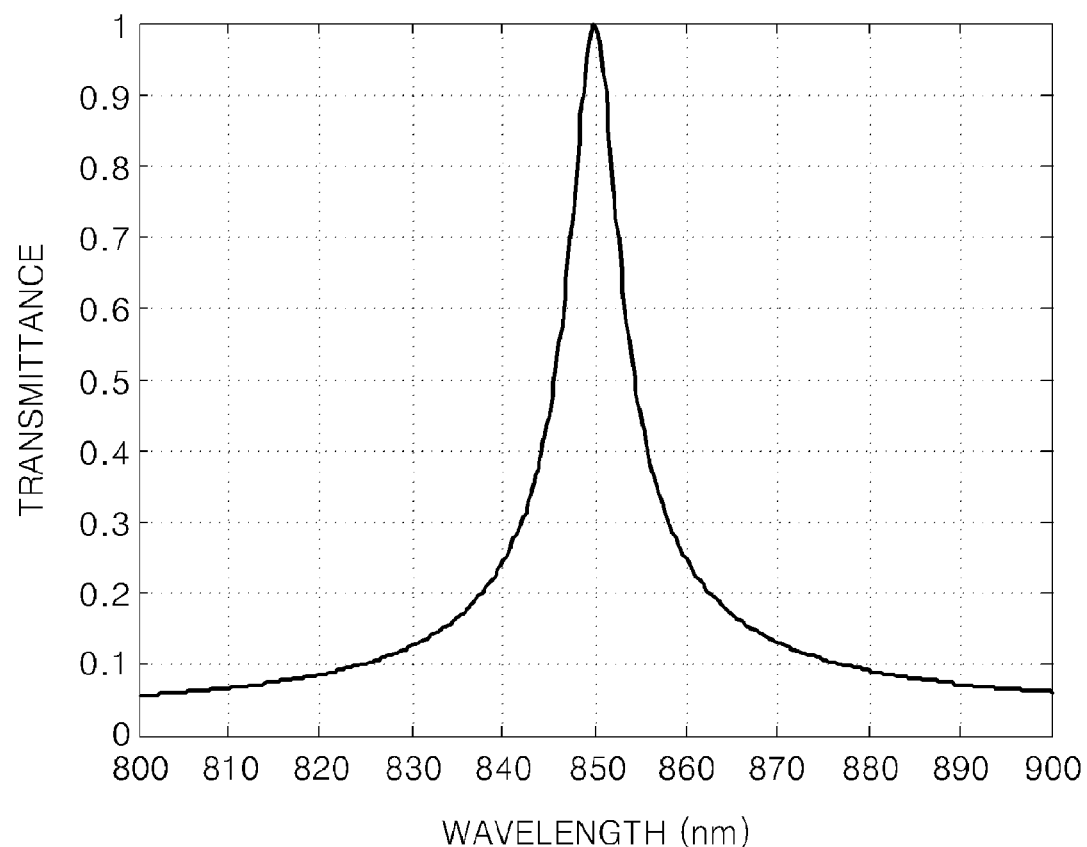
Figure 6:
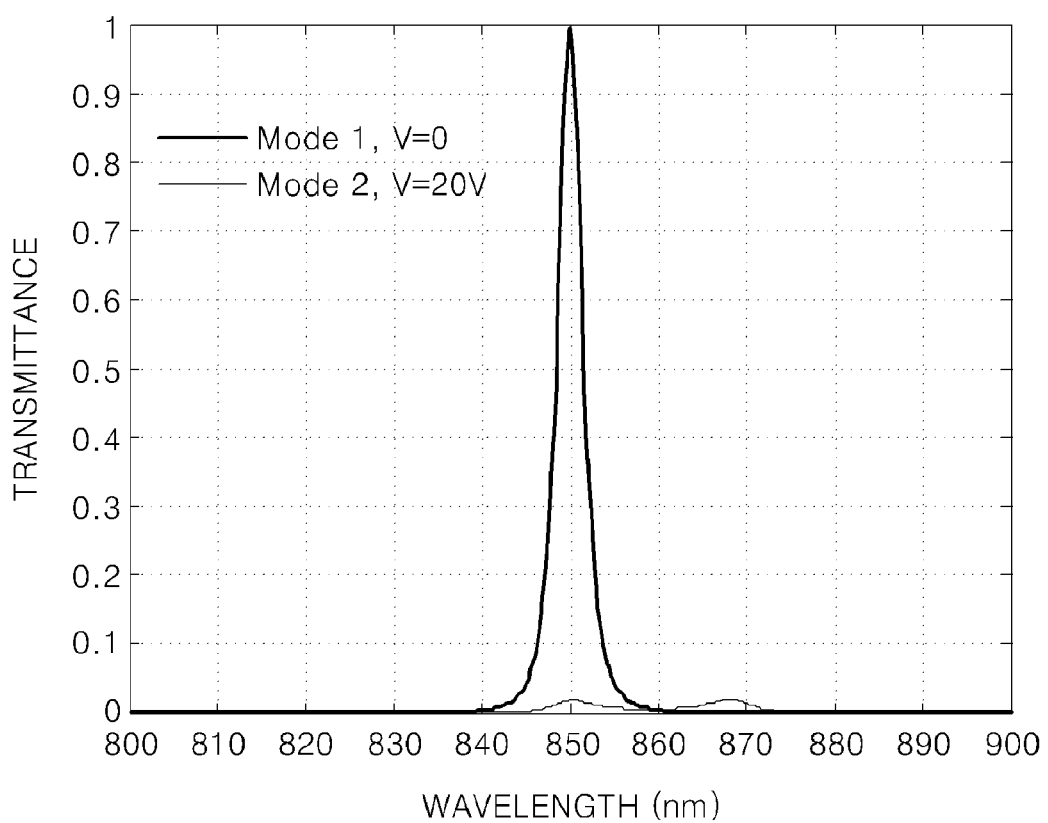

FIGS. 4 through 6 are graphs for explaining general operations of exemplary embodiments of the transmission type light image shutters 100 through 102. Referring to FIG. 4, the graph shows a variation of optical transmittance characteristics of light image shutters 100 through 102 before and during an electric field is applied to the transparent electro-optical thin film layer 14. Light having a center wavelength of about 850 nm is transmitted through the light image shutters 100 through 102 before the electric field is applied to the transparent electro-optical thin film layer 14. Light of 850 nm is exemplary, and other wavelength are possible and within the scope of exemplary embodiments, as would be known to one skilled in the art. A transmittance wavelength may be adjusted according to the refractive index and thickness of the transparent electro-optical thin film layer 14 and the design of the first and second reflective layers 11 and 16. Meanwhile, if a voltage of 20 V is applied to the upper and lower portions of the transparent electro-optical thin film layer 14, an electric field is generated in the transparent electro-optical thin film layer 14 and thus the refractive index of the transparent electro-optical thin film layer 14 changes. Accordingly, the transmittance characteristics of the light image shutters 100 through 102 vary in such a way that light having, for example, a center wavelength of about 870 nm transmits through the light image shutters 100 through 102.

If light incident onto the light image shutters 100 through 102 has a spectrum having a center wavelength of about 850 nm as shown in FIG. 5, the graph of FIG. 6 shows a variation of optical transmittance of the incident light through the light image shutters 100 through 102 before and during an electric field is applied to the transparent electro-optical thin film layer 14. The graph of FIG. 6 is a product of the graphs of FIGS. 4 and 5, showing the amount of the incident light that would be transmitted through shutters 100 through 102 before and during the application of the electric field to transparent lector-optical thin film layer 14. Referring to FIG. 6, incident light having a center wavelength of about 850 nm is mostly transmitted through the light image shutters 100 through 102 before the electric field is applied to the transparent electro-optical thin film layer 14. However, the incident light is almost blocked while the electric field is applied to the transparent electro-optical thin film layer 14. Thus, the light image shutters 100 through 102 may be electrically controlled with respect to the light having a center wavelength of, for example, 850 nm.

In exemplary embodiments, when the transparent electro-optical thin film layer 14 is formed as a crystallized thin film, the transparent electro-optical thin film layer 14 may be formed by using a substrate having a sufficient crystallinity. Once formed, the transparent electro-optical thin film layer 14 may be bonded to a transparent substrate, such as glass, by using a flip-chip bonding method. FIGS. 7A through 7D are cross-sectional views for explaining a method of manufacturing a transmission type optical image shutter according to exemplary embodiments.

Figure 7A:
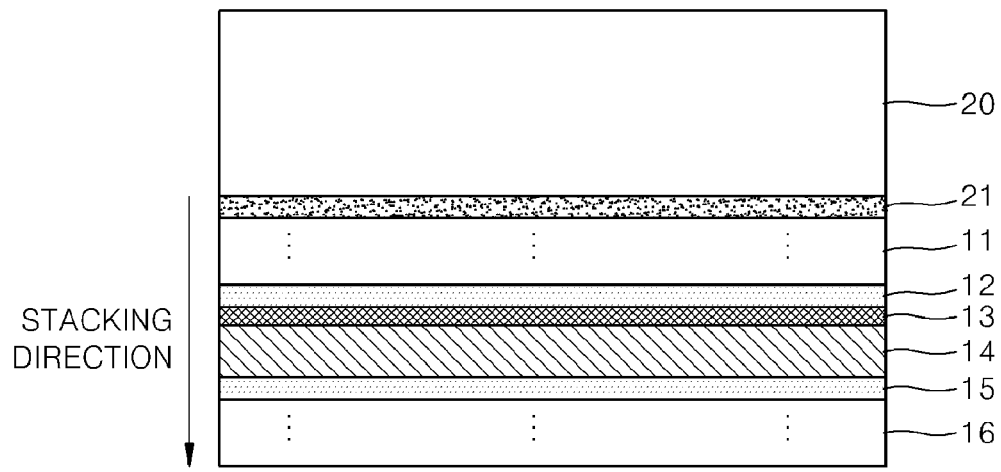
FIGS. 7A through 7D are cross-sectional views for explaining a method of manufacturing a transmission type optical image shutter according to exemplary embodiments of the present invention.

Referring to FIG. 7A, a sacrificial layer 21, the first reflective layer 11, the first transparent electrode 12, and the transparent buffer layer 13 are sequentially formed on a crystalline substrate 20 formed of, for example, Si or GaAs. The descending sequence in which the sacrificial layer 21, the first reflective layer 11, the first transparent electrode 12, and the transparent buffer layer 13 are shown in FIGS. 7A through 7D is opposite to the sequence in which the layers are formed. The descriptions of the first reflective layer 11, the first transparent electrode 12, and the transparent buffer layer 13 are the same as described above. For example, the first transparent electrode 12 may be formed of a transparent metal oxide, such as ITO, AZO, IZO, $SnO_2$, and $In_2O_3$. $SrTiO_3$ may be used to form the transparent buffer layer 13, and thus, a double buffer layer structure in which the first transparent electrode 12 functions as a first buffer layer and the transparent buffer layer 13 functions as a second buffer layer is formed. The crystalline substrate 20 will be removed from the light image shutter and thus may be not transparent but may still be formed of a material having a good crystallinity. Thereafter, the transparent electro-optical thin film layer 14, the second transparent electrode 15, and the second reflective layer 16 may be sequentially formed on the transparent buffer layer 13. In this regard, the transparent electro-optical thin film layer 14 may have a thickness of, for example, 5 μm or less.

Figure 7B:
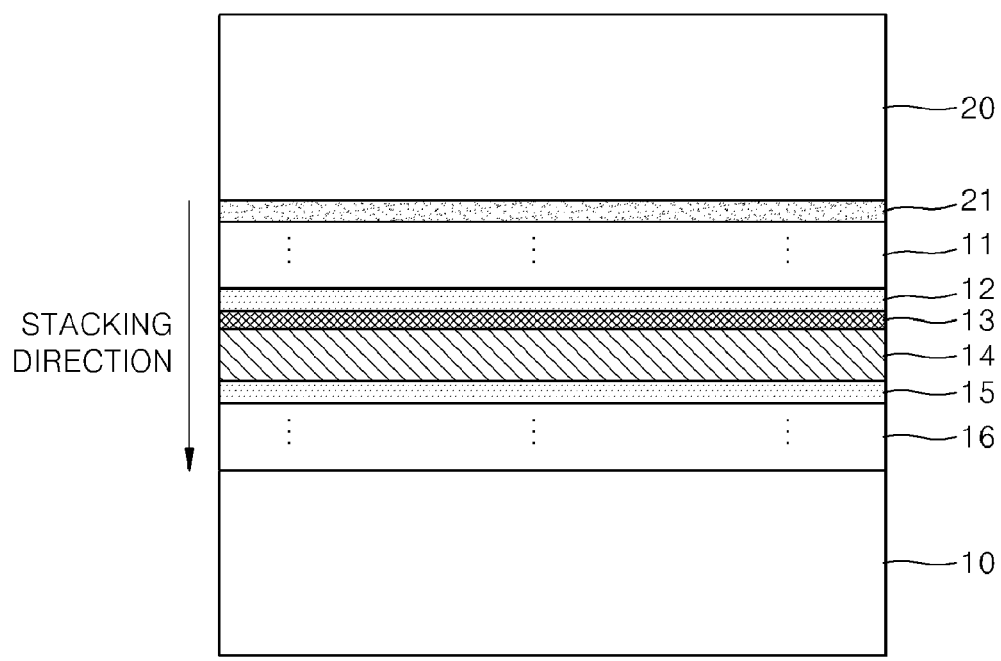
Figure 7C:
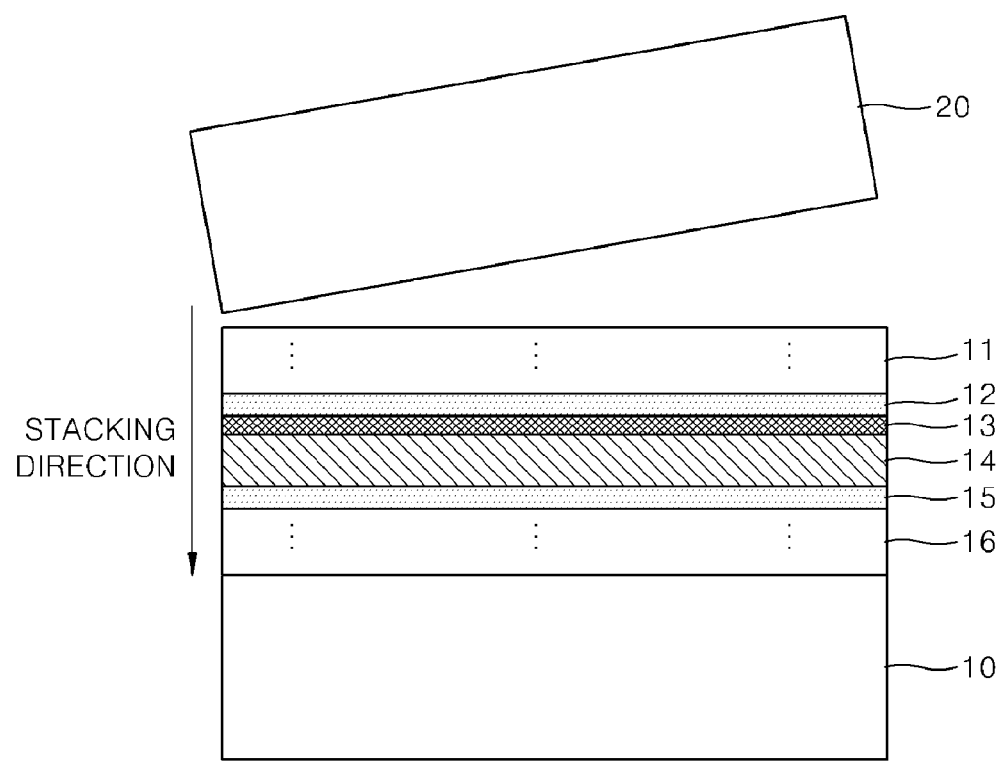
Figure 7D:
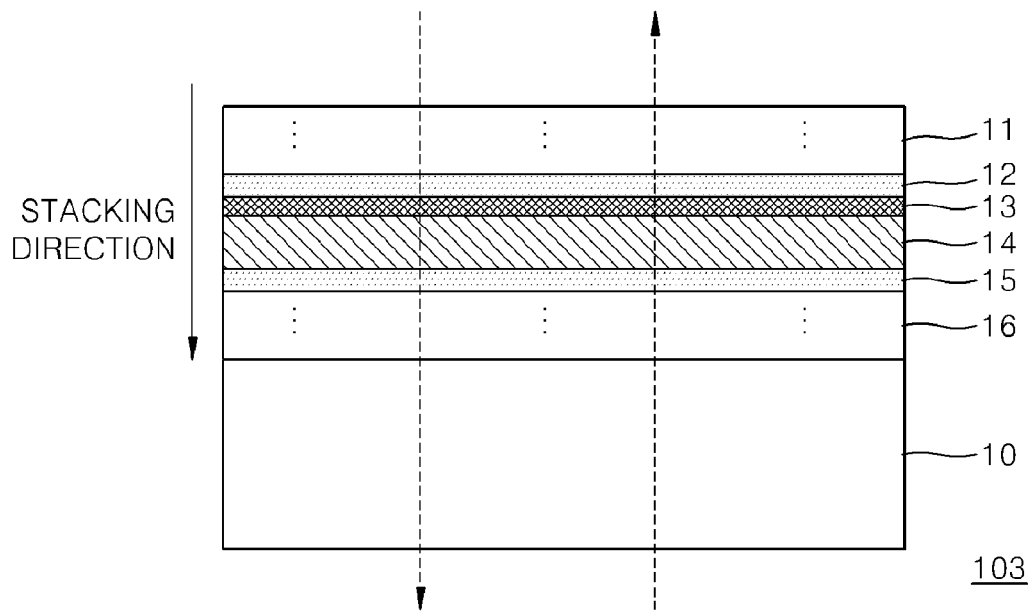

Referring to FIG. 7B, the second reflective layer 16 may be bonded to the transparent substrate 10 by using a flip-chip bonding method. If the sacrificial layer 21 is removed as shown in FIG. 7C, the crystalline substrate 20 is separated from the first reflective layer 11. Finally, a light image shutter 103 having a structure shown in FIG. 7D may be formed. Referring to FIG. 7D, the light image shutter 103 has a structure in which the second reflective layer 16, the second transparent electrode 15, the transparent electro-optical thin film layer 14, the transparent buffer layer 13, the first transparent electrode 12, and the first reflective layer 11 are sequentially arranged on the transparent substrate 10. However, as described with reference to FIGS. 7A through 7D, first reflective layer 11 is formed first, with subsequent layers forming sequentially in the "Stacking Direction" indicated in FIG. 7D.

Figure 8:
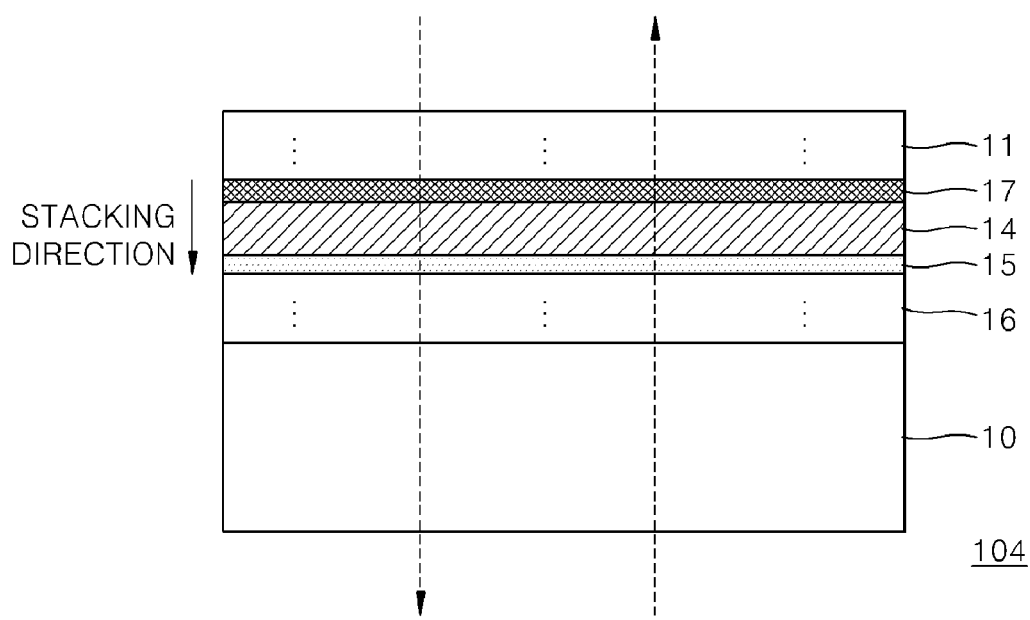
FIG. 8 is a cross-sectional view of a transmission type optical image shutter according to another embodiment of the present invention.

In the light image shutter 103, although the first transparent electrode 12 and the transparent buffer layer 13 are separated from each other, the first transparent electrode 12 and the transparent buffer layer 13 may be formed as a single transparent conductivity buffer layer as described with reference to FIG. 2. Referring to FIG. 8, the transparent conductivity buffer layer 17 formed of a ZnO based material is disposed between the first reflective layer 11 and the transparent electro-optical thin film layer 14. Thus, a light image shutter 104 as shown in FIG. 8 may have a single buffer layer structure in which the transparent conductivity buffer layer 17 simultaneously functions as an electrode and as a buffer layer. However, as described above, it may comprise a double buffer layer structure in which the transparent conductivity buffer layer 17 functions as a first buffer layer and SrTiO$_3$ functions as a second buffer layer, by further forming SrTiO$_3$ between the transparent conductivity buffer layer 17 and transparent electro-optical thin film layer 14. The light image shutter 104 is also manufactured by using a flip-chip bonding method and thus the light image shutter 104 has a structure in which the second reflective layer 16, the second transparent electrode 15, the transparent electro-optical thin film layer 14, the transparent conductivity buffer layer 17, and the first reflective layer 11 are sequentially arranged on the transparent substrate 10. However, as described with reference to FIGS. 7A through 7D, first reflective layer 11 is formed first, with subsequent layers forming sequentially in the "Stacking Direction" indicated in FIG. 8.

Figure 9:
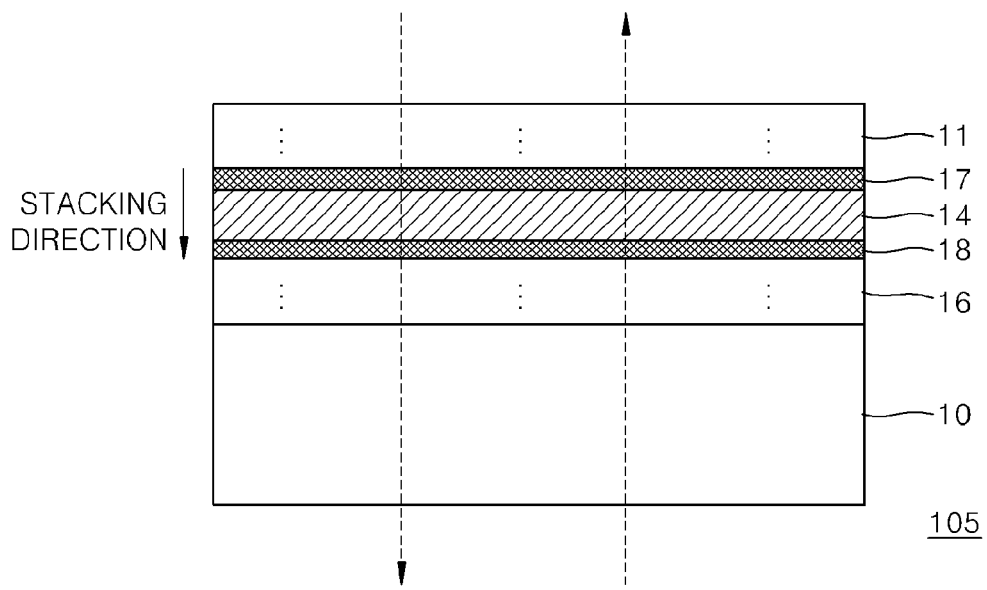
FIG. 9 is a cross-sectional view of a transmission type optical image shutter according to another exemplary embodiment of the present invention.

Further, as described with reference to FIG. 3, a transparent conductivity buffer layer may be formed both on upper and lower portions of the transparent electro-optical thin film layer 14. FIG. 9 is a cross-sectional view of a light image shutter 105 having the structure described above according to an exemplary embodiment. Referring to FIG. 9, the light image shutter 105 is also manufactured by using a flip-chip bonding method and thus the light image shutter 105 has a structure in which the second reflective layer 16, the second transparent conductivity buffer layer 18, the transparent electro-optical thin film layer 14, the first transparent conductivity buffer layer 17, and the first reflective layer 11 are sequentially arranged on the transparent substrate 10. However, it is first reflective layer 11 which is formed first, with the layers sequentially forming in the "Stacking Direction" indicated in FIG. 9.

The operations of the light image shutters 103 through 105 shown in FIGS. 7D, 8, and 9 are the same as those of the light image shutters 100 through 102 described with reference to FIGS. 4 through 6. For example, unless an electric field is applied to the transparent electro-optical thin film layer 14, incident light having a specific wavelength band transmits through the light image shutters 103 through 105. Meanwhile, while the electric field is applied to the transparent electro-optical thin film layer 14, the incident light is blocked by the light image shutters 103 through 105. Thus, the light image shutters 103 through 105 are transmission types.

Figure 10:
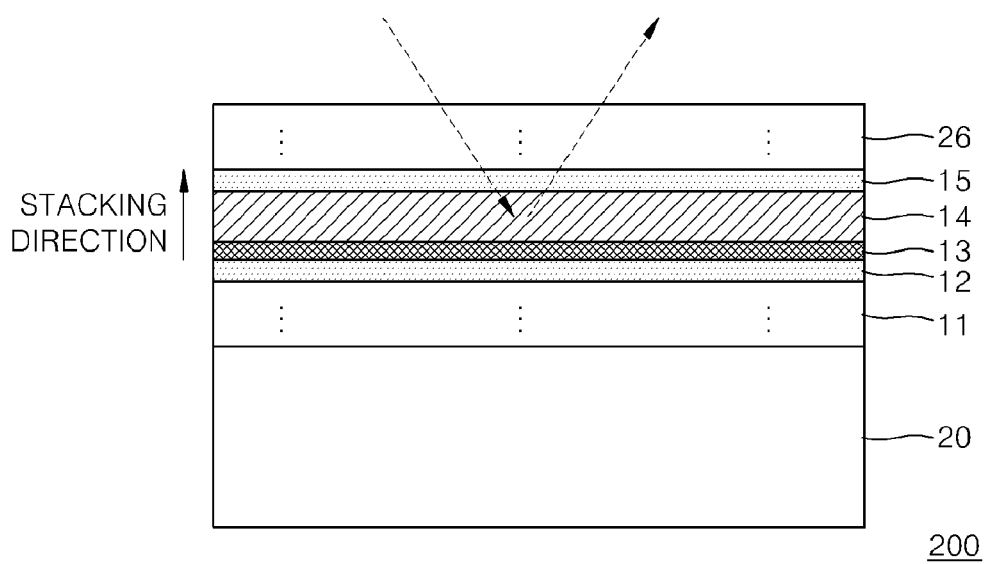
FIG. 10 is a cross-sectional view of a reflection type optical image shutter according to an exemplary embodiment of the present invention.

Although the transmission type light image shutters 100 through 105 are described as transmission types above, the transmission type light image shutters 100 and 105 may instead be reflective type light image shutters having the same structure as described above. For example, FIG. 10 is a cross-sectional view of a reflection type optical image shutter 200 according to an exemplary embodiment. Referring to FIG. 10, the light image shutter 200 may include the substrate 20, the first reflective layer 11 disposed on the substrate 20, the first transparent electrode 12 disposed on the first reflective layer 11, the transparent buffer layer 13 disposed on the first transparent electrode 12, the transparent electro-optical thin film layer 14 disposed on the transparent buffer layer 13, the second transparent electrode 15 disposed on the electro-optical thin film layer 14, and a second reflective layer 26 disposed on the second transparent electrode 15. Thus, the light image shutter 200 has a structure similar to that of the light image shutter 100 shown in FIG. 1.

However, since the light image shutter 200 is a reflection type shutter, a transparent substrate is not used. For example, the light image shutter 200 may use the crystalline substrate 20 formed of, for example, Si or GaAs. Further, the second reflective layer 26 is formed to have a reflectivity of about 50% so as to operate the light image shutter 200 in a reflective manner, whereas the first reflective layer may have a high reflectivity of about 97%. Meanwhile, the first and second reflective layers 11 and 16 of the light image shutter 100 shown in FIG. 1 have a high reflectivity of about 97%, whereas the second reflective layer 26 of the light image shutter 200 has a relatively low reflectivity of about 50%. Thus, incident light resonates between the first and second reflective layers 11 and 26, which form a Fabry-Perot structure, and is finally output to the second reflective layer 26 having a relatively low reflectivity. The components of the light image shutter 200 are the same as the light image shutter 100 shown in FIG. 1.

Figure 11:
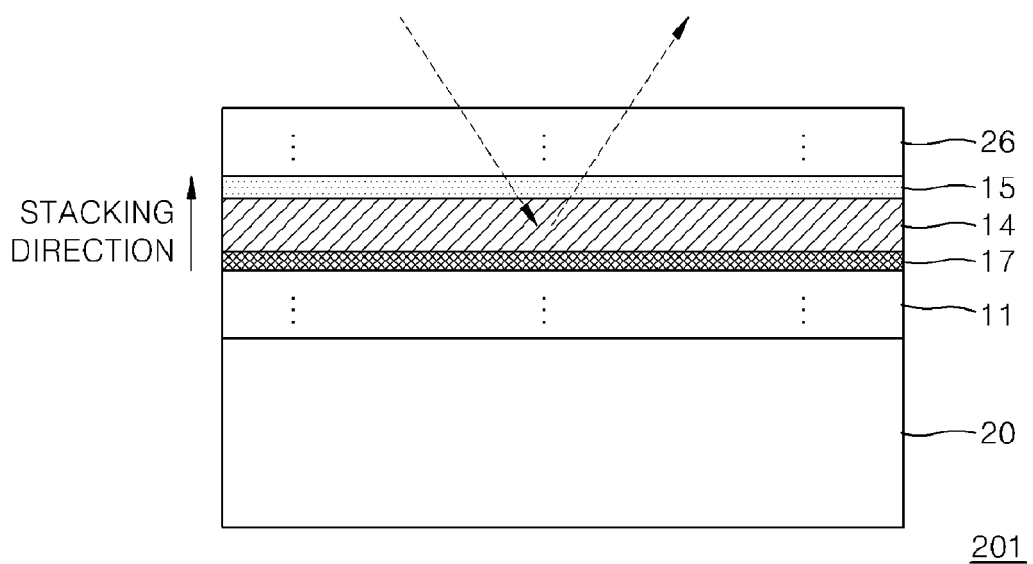
FIG. 11 is a cross-sectional view of a reflection type optical image shutter according to another exemplary embodiment of the present invention.
Figure 12:
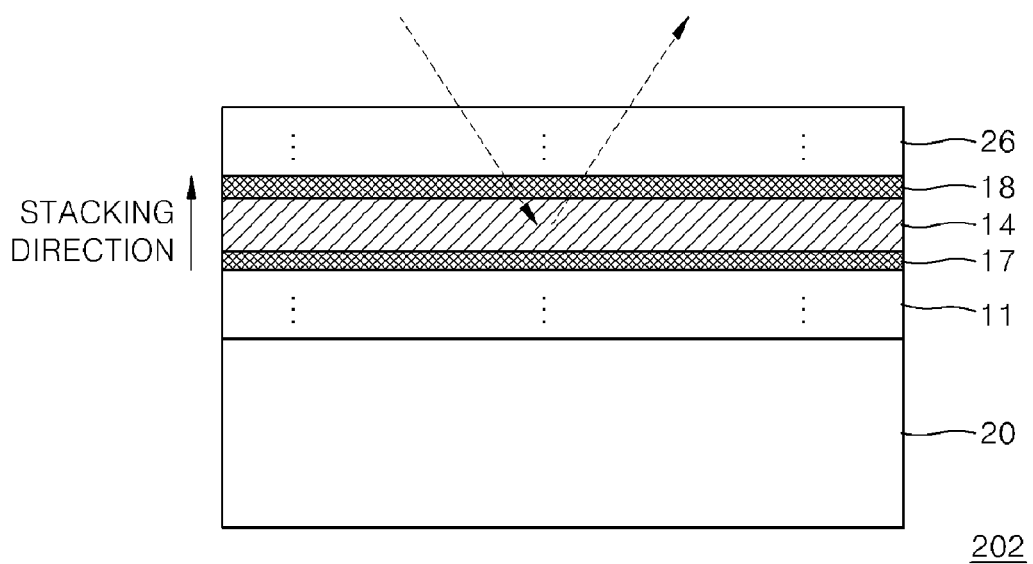
FIG. 12 is a cross-sectional view of a reflection type optical image shutter according to another exemplary embodiment of the present invention.

A light image shutter 201 shown in FIG. 11 has the same construction as the light image shutter 101 shown in FIG. 2, except for the reflectivity of the substrate 20 and the reflectivity of the second reflective layer 26. Further, a light image shutter 202 shown in FIG. 12 has the same construction as the light image shutter 102 shown in FIG. 3, except for the reflectivity of the substrate 20 and the reflectivity of the second reflective layer 26. As described above, the substrate 20 may be crystalline and opaque. The second reflective layer 26 has a relatively low reflectivity of about 50%.

Figure 13:
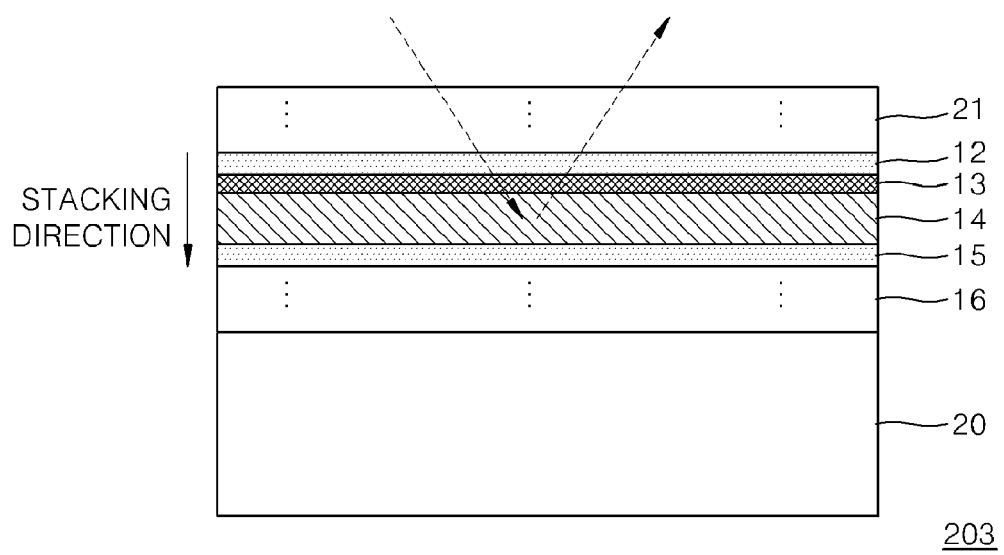
FIG. 13 is a cross-sectional view of a reflection type optical image shutter according to another exemplary embodiment of the present invention.
Figure 14:
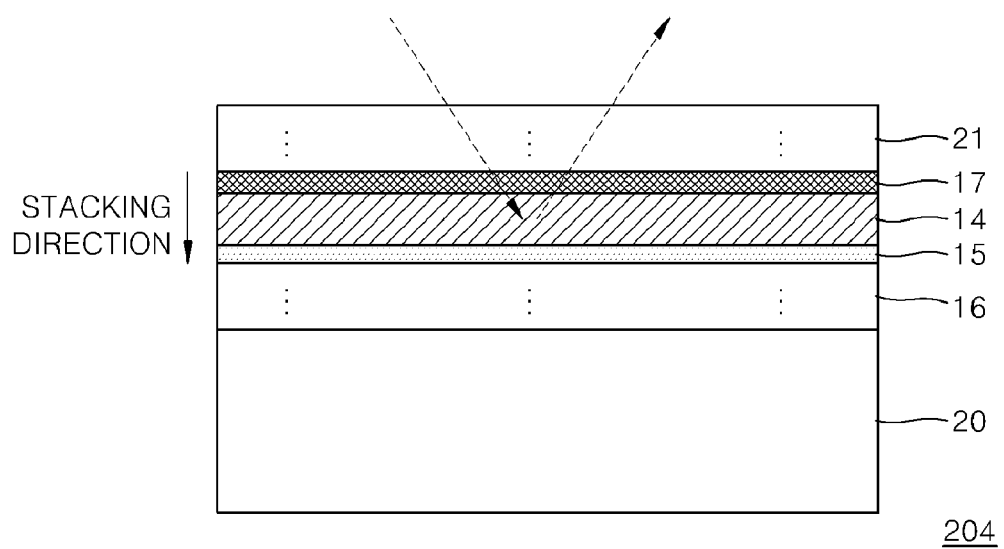
FIG. 14 is a cross-sectional view of a reflection type optical image shutter according to another exemplary embodiment of the present invention.
Figure 15:
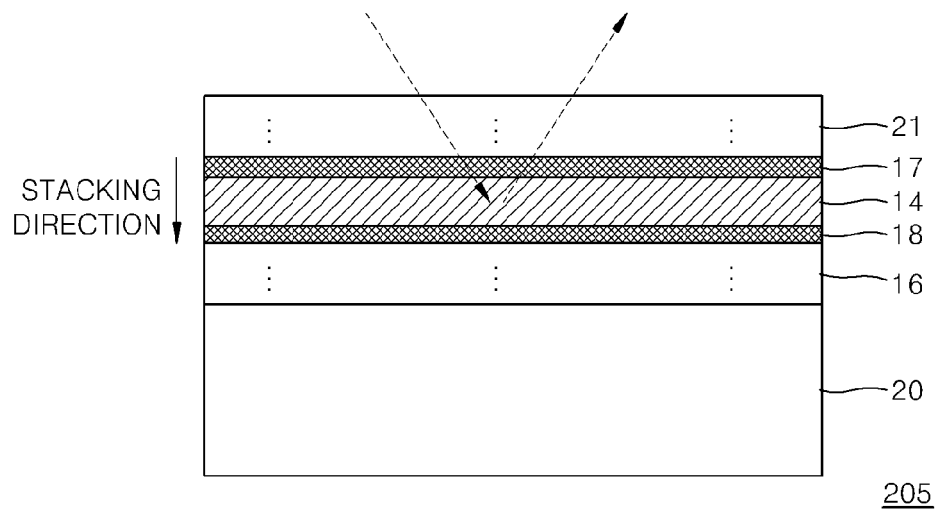
FIG. 15 is a cross-sectional view of a reflection type optical image shutter according to another exemplary embodiment of the present invention.

Referring to FIGS. 13 through 15, light image shutters 203, 204, and 205 are manufactured by using a flip-chip bonding method. Thus, the light image shutters 203, 204, and 205 have similar constructions to the light image shutters 103, 104, and 105 shown in FIGS. 7D, 8, and 9, respectively. For example, the light image shutter 203 has a structure in which the second reflective layer 16, the second transparent electrode 15, the transparent electro-optical thin film layer 14, the transparent buffer layer 13, the first reflective layer 12, and the first reflective layer 21 are sequentially arranged on the substrate 20. However, it is first reflective layer 21 that is formed first, with the subsequent layers formed in sequence according to the "Stacking Direction" indicated in FIG. 13. The first reflective layer 21 of the light image shutters 203, 204, and 205 has a relatively low reflectivity of about 50% so as to operate the light image shutters 203, 204, and 205 in a reflective manner, whereas the second reflective layer 16 may have a relatively high reflectivity of bout 97%. The substrate 20 may have opaque crystallinity as described above. The constructions of the light image shutters 203, 204, and 205 may be the same as the light image shutters 103, 104, and 105 described with reference to FIGS. 7D, 8, and 9, respectively.

Figure 16:
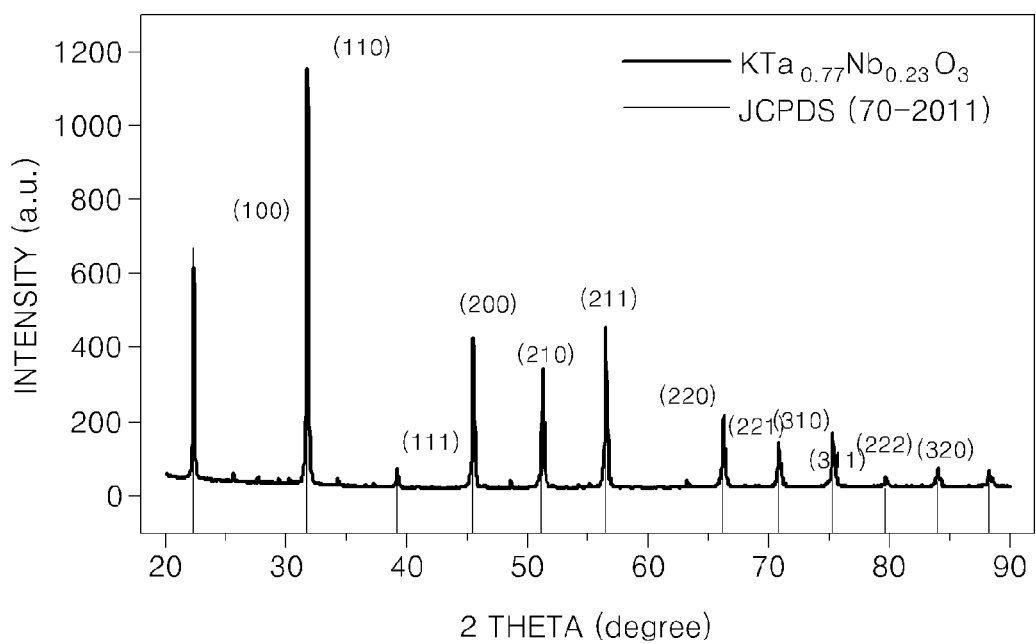
FIGS. 16 through 18 are graphs of patterns of an electro-optical thin film layer formed on a transparent amorphous substrate analyzed by using X-ray diffraction (XRD) according to exemplary embodiments of the present invention.

An experiment in which a $KTa_{1-x}Nb_xO_3$ (KTN) target is manufactured by using $Nb_2O_5$ and $Ta_2O_5$ powders was performed, and a KTN thin film deposition was performed on the KTN target by using a pulsed laser deposition (PLD). Referring to FIG. 16, the crystallinity of the KTN target that is to be used during a PLD operation was measured by X-ray diffraction (XRD). The graph of FIG. 16 shows that a ratio of Ta:Nb is 0.77:0.23.

Figure 17:
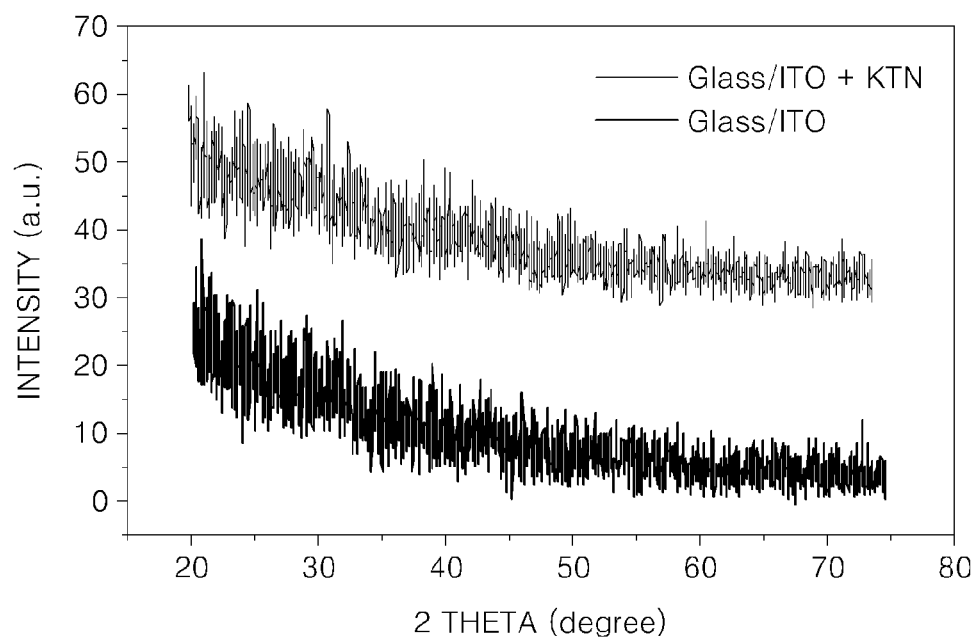
Figure 18:
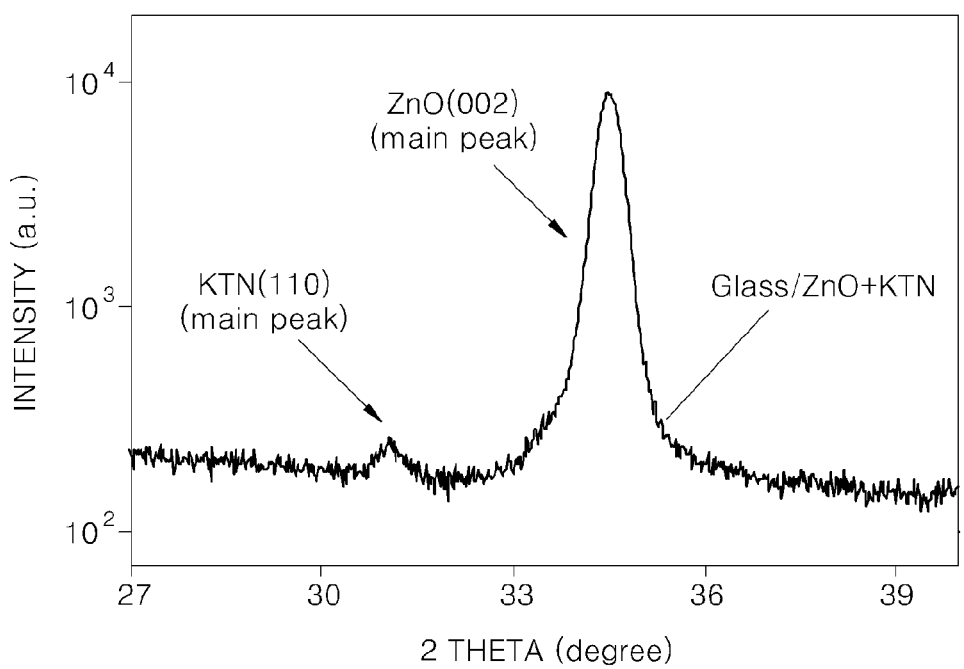

Referring to FIG. 17, amorphous ITO was deposited on an amorphous glass substrate, KTN was deposited thereon as a thin film, and the deposited KTN thin film was measured by XRD. The graph of FIG. 17 shows the typical amorphous characteristics exhibited before and after the KTN thin film is deposited, i.e., a particular peak is not observed. This means that KTN is not crystallized. Meanwhile, referring to FIG. 18, a ZnO buffer layer was deposited on an amorphous glass substrate, a KTN thin film was deposited thereon, and the deposited KTN thin film was measured by XRD. In this regard, ZnO, having a lattice constant of a=3.3 Å closer to the lattice constant of KTN of a=3.99 Å, is doped with Al or Ga, and thus the lattice constant of ZnO is much more similar to that of KTN, as shown as a peak 110. The graph of FIG. 18 shows that the KTN peak 110 is observed around 31 degrees. Thus, the KTN thin film is determined to have been crystallized and deposited from the XRD result.

As described above, according to the one or more of the above exemplary embodiments, the crystalline electro-optical thin film layer 14 may be formed at a low temperature by using the inexpensive transparent substrate 10, such as a glass substrate. Thus, cost reduction and yield increases may be achieved in manufacturing a light image shutter. Also, since an electro-optical crystal may be formed in the form of a thin film on the glass substrate, the light image shutter may have a small thickness. For example, the total thickness of the light image shutter may be between about 100 μm and about 1 mm, or below 100 micrometers without considering the glass substrate. The light image shutter including the crystalline electro-optical thin film layer 14 may have a very fast shutter opening and closing time of about tens of ns, and thus the light image shutter may be used in various optical devices, such as a camera, a flat display, an optical modulator, a 3D camera, LADAR, etc.

While the exemplary embodiments have been shown and described, it will be understood by those skilled in the art that various changes in form and details may be made thereto without departing from the spirit and scope of the inventive concept as defined by the appended claims.

In addition, many modifications can be made to adapt a particular situation or material to the teachings of this disclosure without departing from the essential scope thereof. Therefore, it is intended that the inventive concept not be limited to the particular exemplary embodiments disclosed, but that the inventive concept will include all embodiments falling within the scope of the appended claims.

What is claimed is:

1. A light image shutter comprising:
a transparent amorphous substrate;
a first reflective layer disposed on the transparent amorphous substrate;
a crystalline transparent buffer layer disposed on the first reflective layer;
a crystalline electro-optical thin film layer disposed on the crystalline transparent buffer layer, comprising a refractive index which varies with respect to an electric field;
a transparent electrode disposed on the crystalline electro-optical thin film layer; and
a second reflective layer disposed on the transparent electrode.

2. The light image shutter of claim 1, wherein the transparent amorphous substrate comprises glass.

3. The light image shutter of claim 1, wherein a difference between a lattice constant of the crystalline transparent buffer layer and a lattice constant of the crystalline electro-optical thin film layer is less than 20%.

4. The light image shutter of claim 1, wherein the crystalline transparent buffer layer comprises a first buffer layer having conductivity and a second buffer layer having a crystalline structure, and
wherein the crystalline structure of the second buffer layer and a crystalline structure of the crystalline electro-optical thin film layer are substantially same.

5. The light image shutter of claim 4, wherein the first buffer layer comprises a transparent conductive oxide.

6. The light image shutter of claim 5, wherein the transparent conductive oxide comprises a material based on ITO, AZO, IZO, $SnO_2$, $In_2O_3$, or a ZnO.

7. The light image shutter of claim 4, wherein the second buffer layer comprises $SrTiO_3$.

8. The light image shutter of claim 1, wherein the crystalline transparent buffer layer comprises a ZnO based material.

9. The light image shutter of claim 8, wherein the transparent buffer layer comprises ZnO doped with Al or Ga between 1 mol % and 5 mol %.

10. The light image shutter of claim 8, wherein the ZnO based material comprises Al—In—Zn—O, In—Ga—Zn—O, Sn—Ga—Zn—O, or Sn—Al—Zn—O.

11. The light image shutter of claim 8, wherein the crystalline transparent buffer layer has a multi-layer structure comprising an order of ZnO, Ag, and ZnO.

12. The light image shutter of claim 1, wherein the crystalline transparent buffer layer comprises a first material and the transparent electrode comprises a second material, and
wherein the first material and the second material are substantially same.

13. The light image shutter of claim 1, wherein the crystalline electro-optical thin film layer comprises at least one selected from the group consisting of $KTa_{1-x}Nb_xO_3$ ($0 \leq x \leq 1$) (KTN), $LiNbO_3$ (LN), Pb $(ZrO_{1-x}Ti_x)$ $O_3$ ($0 \leq x \leq 1$) (PZT), and 4-dimethylamino-N-methyl-4 stilbazolium (DAST).

14. An optical device comprising the light image shutter of claim 1.

15. A light image shutter comprising:
a transparent substrate;
a first reflective layer disposed on the transparent substrate;
a transparent electrode disposed on the first reflective layer;
a crystalline electro-optical thin film layer disposed on the transparent electrode, comprising a refractive index which varies with respect to an electric field;
a crystalline transparent buffer layer disposed on the crystalline electro-optical thin film layer; and
a second reflective layer disposed on the crystalline transparent buffer layer.

16. The light image shutter of claim 15, wherein the crystalline transparent buffer layer comprises a first buffer layer having conductivity and a second buffer layer having a crystalline structure, and
wherein the crystalline structure of the second buffer layer and a crystalline structure of the crystalline electro-optical thin film layer are substantially same.

17. The light image shutter of claim 16, wherein the first buffer layer comprises a material based on ITO, AZO, IZO, $SnO_2$, $In_2O_3$, or a ZnO, and
wherein the second buffer layer comprises $SrTiO_3$.

18. The light image shutter of claim 15, wherein the crystalline transparent buffer layer comprises a ZnO based material.

19. A method of manufacturing a light image shutter, the method comprising:
- forming a first reflective layer on a transparent amorphous substrate;
- forming a crystalline transparent buffer layer on the first reflective layer;
- forming a crystalline electro-optical thin film layer comprising a refractive index which varies with respect to an electric field, on the crystalline transparent buffer layer;
- forming a transparent electrode on the crystalline electro-optical thin film layer; and
- forming a second reflective layer on the transparent electrode.

20. The method of claim 19, wherein the forming of the crystalline electro-optical thin film layer comprises forming the crystalline electro-optical thin film layer at a temperature below 300° C. using a pulsed laser deposition (PLD).

21. The method of claim 19, wherein the crystalline transparent buffer layer comprises a first buffer layer having conductivity and a second buffer layer having a crystalline structure, and
wherein the crystalline structure of the second buffer layer and a crystalline structure of the crystalline electro-optical thin film layer are substantially same.

22. The method of claim 21, wherein the first buffer layer comprises a material based on ITO, AZO, IZO, $SnO_2$, $In_2O_3$, or a ZnO, and
wherein the second buffer layer comprises $SrTiO_3$.

23. The method of claim 19, wherein the crystalline transparent buffer layer comprises a ZnO based material.

24. The method of claim 23, wherein the forming of the transparent buffer layer comprises doping ZnO with Al or Ga between 1 mol % and 5 mol %.

25. The method of claim 23, wherein the ZnO based material comprises Al—In—Zn—O, In—Ga—Zn—O, Sn—Ga—Zn—O, or Sn—Al—Zn—O.

26. The method of claim 23, wherein the crystalline transparent buffer layer has a multi-layer structure comprising an order of ZnO, Ag, and ZnO.

27. A method of manufacturing a light image shutter, the method comprising:
- forming a sacrificial layer on a crystalline substrate;
- forming a first reflective layer on the sacrificial layer;
- forming a crystalline transparent buffer layer on the first reflective layer;
- forming a crystalline electro-optical thin film layer comprising a refractive index which varies with respect to an electric field, on the crystalline transparent buffer layer;
- forming a transparent electrode on the crystalline electro-optical thin film layer;
- forming a second reflective layer on the transparent electrode;
- bonding the second reflective layer on a transparent substrate by using a flip-chip bonding method; and
- removing the sacrificial layer and the crystalline substrate from the first reflective layer.

* * * * *